Figure 9:
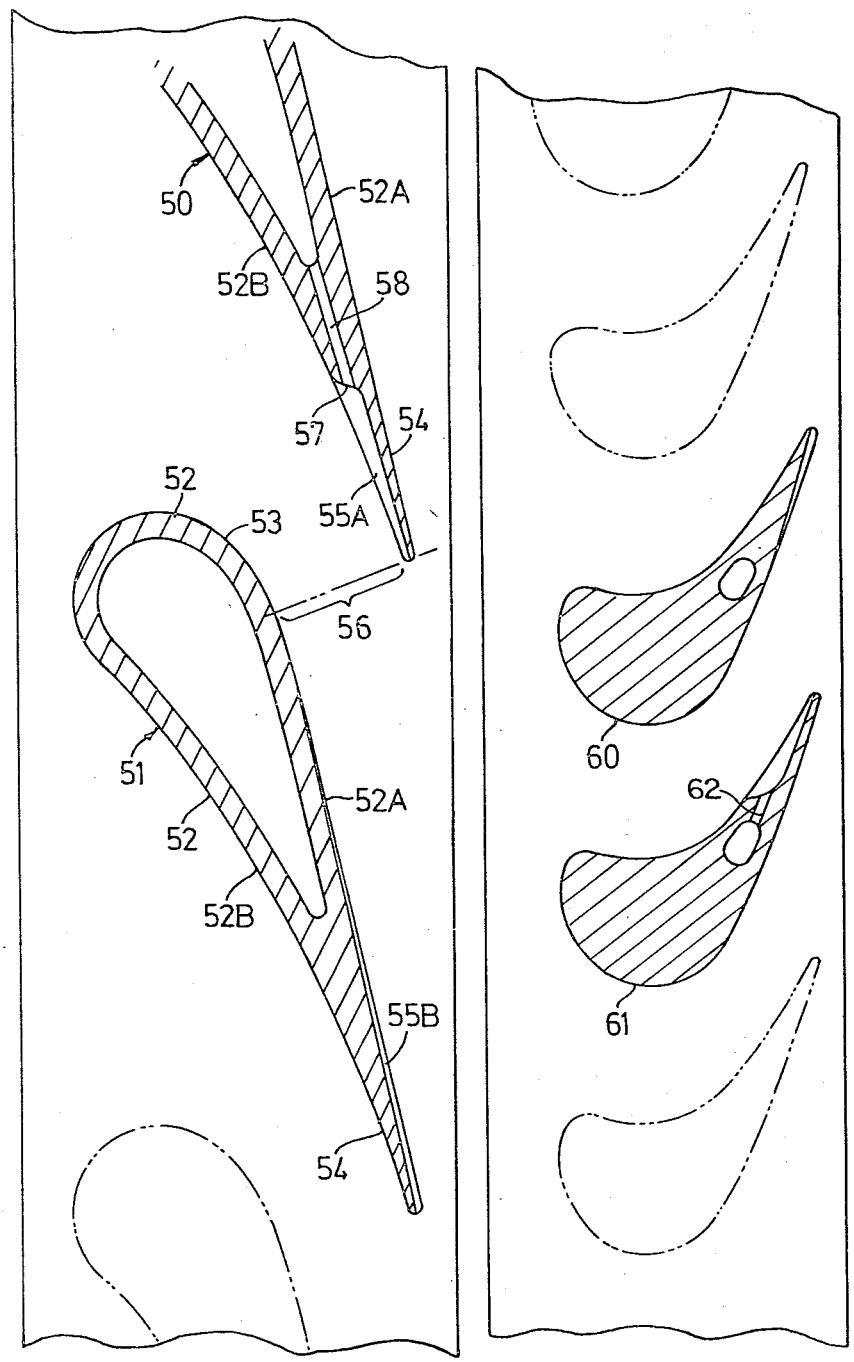

United States Patent [19]

Scott

[11] 4,229,140
[45] Oct. 21, 1980

[54] TURBINE BLADE

[75] Inventor: Alexander Scott, Bristol, England

[73] Assignee: Rolls-Royce (1971) Ltd., London, England

[21] Appl. No.: 973,601

[22] Filed: Dec. 15, 1978

Related U.S. Application Data

[63] Continuation of Ser. No. 694,031, Jun. 16, 1976, abandoned, which is a continuation of Ser. No. 413,189, Nov. 14, 1973, abandoned.

[30] Foreign Application Priority Data

Nov. 28, 1972 [GB] United Kingdom .............. 54985/72

[51] Int. Cl.³ .................................... F01D 5/18
[52] U.S. Cl. ................... 416/97 R; 415/115
[58] Field of Search ............. 416/90 R, 95, 96 R, 416/97 R, 232, 233, 236 R; 415/115, 116, 117, 119; 60/39.66

[56] References Cited

U.S. PATENT DOCUMENTS

| | | | |
|---|---|---|---|
| 2,238,749 | 4/1941 | Peltier | 415/119 |
| 2,647,368 | 8/1953 | Triebbnigg et al. | 416/90 |
| 3,423,069 | 1/1969 | Chandley | 416/92 |
| 3,628,885 | 12/1971 | Sidenstick et al. | 416/97 |

FOREIGN PATENT DOCUMENTS 1222565  2/1971  United Kingdom .................. 416/96 A Primary Examiner—Stephen C. Bentley
Attorney, Agent, or Firm—Stevens, Davis, Miller & Mosher

[57] ABSTRACT

A turbine blade comprising an aerofoil-shaped body having a main portion and a trailing portion, the latter being of undulating shape so as to define at each side of the blade chordally extending troughs. The blade may include cooling air holes extending from the interior of the main portion to a surface of the troughs.

3 Claims, 9 Drawing Figures

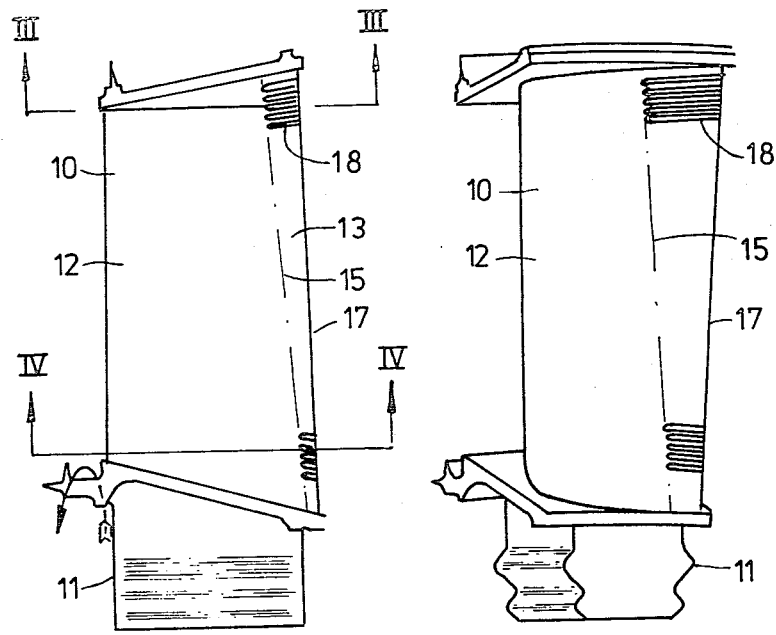
FIG. 2   FIG. 1
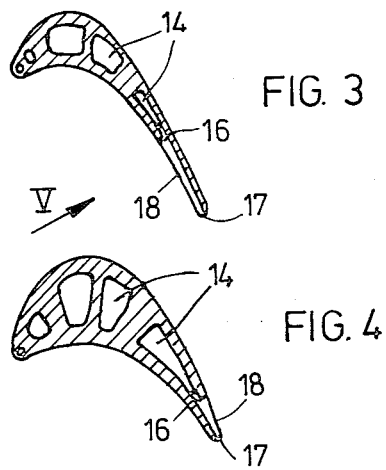
FIG. 3
FIG. 4

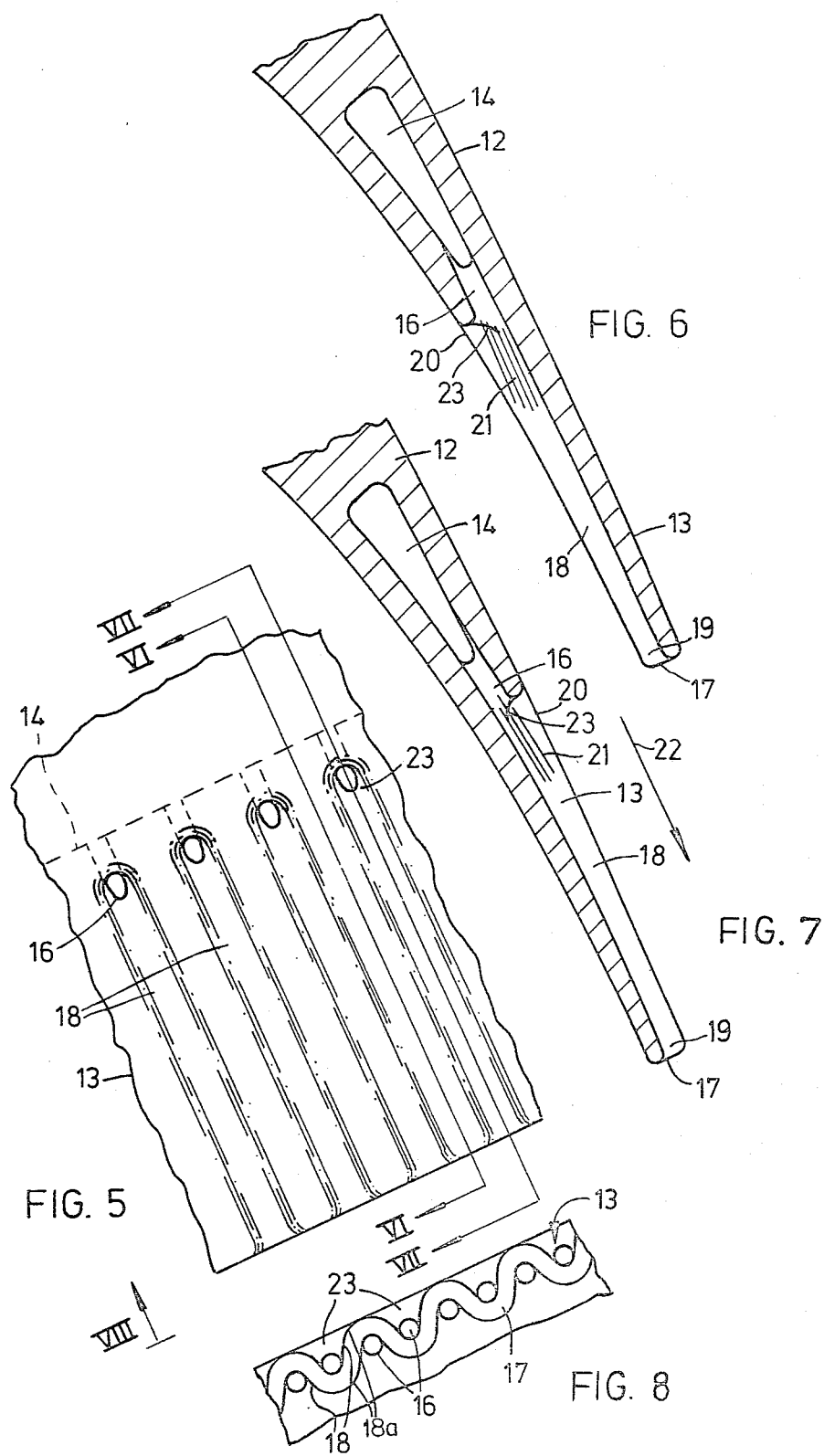

TURBINE BLADE

This is a continuation of Ser. No. 694,031, filed 6/16/76, now abandoned, which is a continuation of Ser. No. 413,189, filed 11/14/73, now abandoned.

This invention relates to turbine blades for use in gas turbine engines.

It is known for such blades to comprise an aerofoil-shaped body including a main portion and a trailing portion integral therewith. For aerodynamic reasons the trailing portion is thin compared to the main portion and this gives rise to problems of mechanical strength and of cooling.

As regards mechanical strength, the problem is that when the temperature of the gaseous environment of the blade changes, as during starting or shutting down of the engine, the relatively thinner trailing portion expands or contracts faster than the main portion and this gives rise to an unfavorable stress condition. Also the trailing portion is subject to gas forces tending to bend or vibrate this portion relative to the main portion.

As regards cooling it will be apparent that the relatively thin cross-section of the trailing portion makes it difficult to provide cooling air holes therein. If such holes are brought from the interior of the main portion through the trailing portion to the free extremity thereof, there is the requirement of drilling long holes of relatively small diameter. If, on the other hand, the holes are brought from the interior of the main portion to the surface of the blade in a position upstream of the trailing extremity, there is the requirement of having the holes break through said surface in a direction as nearly as possible parallel to the direction of local gas flow over the blade. Both these requirements are associated with manufacturing difficulties.

The twin need for mechanical strength and cooling of the trailing portion has tended to dominate the design of the trailing portion to the detriment of aerodynamic performance.

It is an object of this invention to provide a turbine blade in which the above difficulties relating to mechanical strength are alleviated.

It is optionally also an object of this invention to provide a turbine blade in which the above difficulties relating to cooling are alleviated.

According to this invention there is provided a turbine blade for use in a gas turbine engine, comprising an aerofoil-shaped body including a main portion and a trailing portion integral therewith, wherein the trailing portion is of undulating shape so as to define at each side of the trailing portion chordally extending troughs.

The undulating shape of the trailing portion makes it possible for this portion to expand or contract relative to the main portion with less stress than is the case in a conventional, i.e. straight, trailing portion.

Also according to this invention there is provided a turbine blade comprising cooling air holes extending between the interior of the main portion and the troughs at at least one side of the trailing portion.

This makes it possible for the trailing portion to be cooled by discharging cooling air into the troughs at points upstream of the free extremity of the portion and in such a way that the holes break through the surface of the trough in a direction substantially parallel to the direction of local gas flow over the blade.

Examples of turbine blades according to this invention will now be described with reference to the accompanying drawings wherein:

FIG. 1 is an axial end view of a turbine rotor blade for a gas turbine engine,
FIG. 2 is a side view of FIG. 1,
FIG. 3 is a section on the line III—III in FIG. 2,
FIG. 4 is a section on the line IV—IV in FIG. 2,
FIG. 5 is an enlarged view of part of FIG. 3 as seen in the direction of the arrow 7,
FIG. 6 is a section on the line VI—VI in FIG. 5,
FIG. 7 is a section on the line VII—VII in FIG. 5,
FIG. 8 is an end view of FIG. 5 in the direction of the arrow VIII,
FIG. 9 is a section similar to FIGS. 6, 7 but showing a stator and rotor stage of blades embodying a modification.

Referring to FIGS. 1 to 8, a cast blade comprises an aerofoil-shaped body 10 and a root 11 by which the body 10 is attachable to a turbine disc (not shown) in a manner known per se. The body 10 is regarded as comprising a main portion 12 and integral trailing portion or wall 13. No distinct line is normally used for defining the junction of the main and trailing portions but in the context of this invention the term "trailing portion" is applied to that trailing part of the body 10 which is so thin compared to the remainder of the body that special problems of mechanical strength or cooling arise, and for the purpose of illustration a line 15 is taken to define the junction between the main and the trailing portions.

To improve the mechanical strength of the trailing portion, this portion is made to be of undulating shape (FIG. 8) so as to define at each side of the blade chordally extending troughs 18 and ribs 18a having a downstream end 19 at the free extremity, denoted 17, of the portion 13 and an upstream end 20 at the line 15 (FIGS. 6 and 7). It will be clear that the undulating shape is capable of spanwise expansion or contraction relative to the main portion 12 with much less likelihood of cracking than a shape which is straight in the spanwise direction. Also, the undulating shape has greater cantilever strength against transverse forces compared to a straight trailing portion of the same weight.

The troughs also provide a convenient way of cooling the trailing portion by holes 16 extending transversely from a chordal plenum passage 14 to a surface of any or each of the troughs 18. While one or more holes 16 may be arranged to break through the surface of a trough at any selected point, a preferred way is to have one hole only and arrange this in such a way that it enters the trough at the upstream end thereof in the direction of the length of the trough. In this way it is possible to inject into the trough a jet 21 of cooling air (FIGS. 6 and 7) in a direction parallel to the local direction 22 of ambient gas flow and such that the jet can be expected to spread over the surface of the trough as it passes towards the downstream end thereof and thereby form an effective cooling film. To avoid undue length of the hole 16, the trough is made of sufficient depth for the hole to enter the trough near the upstream end thereof at a wall 23. Compared with blades where cooling air is supplied through holes which extend through the interior of the edge portion to emerge at the free extremity thereof, the arrangement described makes possible a higher rate of cooling, an aerodynamically desirable lesser thickness of the trailing edge extremity, and shorter cooling air holes. Also the improved mechanical strength and improved cooling are complementary in that both reduce the sensitivity of the trailing portion to differential thermal changes.

It is to be understood that the undulations of the edge portion may extend over the whole of the span of the blade or only over the part where performance requirements make this desirable. For convenience of illustration FIGS. 1 and 2 show only some of the troughs of the undulations.

Referring to FIG. 9, there are shown two turbine stator blades 50, 51 each comprising an aerofoil-shaped body 52 having high and low pressure sides 52A, 52B respectively. Each body 52 includes a main portion 53 and integrally therewith a trailing portion 54 which is of undulating shape so as to define at each side of the portion 54 chordally extending troughs, the troughs at the sides 52A, 52B being denoted 55A, 55B respectively. The blades define between them a throat 56 being the location where the distance between the blades is a minimum. The blades are designed, in accordance with principles known per se, for the gas velocity downstream of the throat to be supersonic. It will be seen that, for any one blade, the flow over the trailing portion is supersonic along the low pressure surface but not at the high pressure side. Also, the low pressure side of the trailing portion is subject to a lesser temperature than the high pressure side so that the need for cooling is more acute than at the low pressure side. On the other hand, at the low pressure side 52B the requirement for aerodynamic continuity is more important than at the high pressure side because of the need to avoid shock waves which arise if supersonic flow passes over discontinuous surfaces. Accordingly, as shown in respect of blade 50, the troughs 55A of the trailing portion are adapted for cooling in that their depth is arranged so that at their upstream ends there is formed a wall 57 for the convenient emergence into the trough of a cooling air hole 58 generally similar to the arrangement described with reference to FIGS. 1 to 7. The aerodynamic discontinuity presented by the wall 57 is not a difficulty partly because the air emerging from the hole discourages turbulence of the gas flow when the latter passes the wall 57, and partly because subsonic flow does not generate shock waves. However, at the low pressure side the presence of a discontinuity, such as is constituted by the wall 57, is not allowable and, as shown in respect of blade 51, the trough 55B is made of gradually decreasing depth so as to merge smoothly into the surface of the main portion as shown.

FIG. 9 also shows rotor blades 60,61 in operative relation to the blades 50,51. The blades 60,61 have an organization of troughs similar to the blades 50, 51 except in that cooling holes 62 are provided on the high pressure side of the blade only.

It is to be understood that FIG. 9 shows stator and rotor blades in accordance with their operative relationship in a turbine but that the sectional planes of the blades 50,51 are at different levels so as to make it possible to show the respective troughs 55A, 55B. The same applies to the blades 60,61.

I claim:

1. A turbine blade comprising an aerofoil-shaped body having spanwise and chordal extent and including a main portion and a trailing portion, the trailing portion having an upstream end integral with the main portion and a free downstream extremity, the trailing portion being a single wall having an undulating shape defining exteriorly of the wall and at each side thereof chordally extending troughs and ribs, wherein any one rib at one side of the wall has a hollow back defined by one of said troughs at the other side of the wall, and wherein the troughs are open to said downstream extremity and terminate at said upstream end, and cooling air holes extending between the interior of the main portion and the troughs at at least one side of the wall.

2. A turbine blade according to claim 1 wherein the holes are positioned to emanate from the main portion in the direction of the length of the troughs.

3. A turbine blade according to claim 2 wherein at at least one side of the wall there are troughs whose depth is such that there is formed at the upstream end of the trough another wall having a surface which is aerodynamically discontinuous with the surface of the main portion, and said holes are arranged to be open to the trough at said wall surface.

* * * * *